Patented Mar. 9, 1943

2,313,155

UNITED STATES PATENT OFFICE 2,313,155

CHLORANTHRAQUINONES AND A PROCESS OF MAKING THEM

Paul Kränzlein, Leverkusen-I. G.-Werk, Germany, assignor to General Aniline & Film Corporation, a corporation of Delaware No Drawing. Original application February 25, 1938, Serial No. 192,564. Divided and this application November 28, 1940, Serial No. 367,593. In Germany February 27, 1937

8 Claims. (Cl. 260—365)

The present invention relates to chloranthraquinones and to a process of preparing the same.

I have found that primary amines containing a diphenyl linkage and corresponding with the following general formula

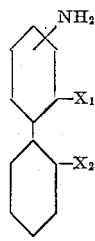

wherein the nucleus containing the amino group may contain further substituents, $X_1$ and $X_2$, representing hydrogen or standing together for the group:

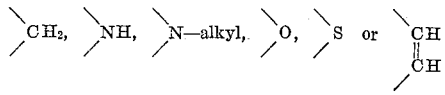

or derivatives or salts of such amines may be condensed, in the presence of an acid condensing agent, such as aluminium chloride or zinc chloride, with phthalic anhydride or a substitution product thereof. There are formed, with a good yield, the corresponding aroyl-benzoic acids which, in the same or in another process, may be further condensed to form the anthraquinone derivatives. Such smooth condensations with phthalic anhydrides could not be foreseen. It was rather to be supposed, that the free primary base would react with the phthalic anhydride, especially in the presence of aluminium chloride, to form an acylation product or a phthalanil. By the new reaction it is possible to prepare a great number of hitherto unknown anthraquinone derivatives or the corresponding aroyl-benzoic acids which are very valuable in the manufacture of dyestuffs. For instance by sulfonation of the anthraquinone derivatives there are obtained acid wool dyestuffs.

The following examples serve to illustrate the invention, but they are not intended to limit it thereto; the parts are by weight, unless otherwise stated. The relationship between parts by weight and parts by volume is that which exists between a kilo and a liter.

1. 9 parts of 3-methyl-4-aminodiphenyl are run at 120° C., into a melt of 120 parts of sodium chloride-aluminium chloride while stirring. The reaction mixture is allowed to cool to 110° C. and 8 parts of phthalic anhydride are added. On addition of the latter, the temperature rises quickly. As the reaction temperature must by no means surpass 120° C., the whole is preferably somewhat cooled or the phthalic anhydride is added in small portions. The temperature is then maintained while well stirring for 30–45 minutes at 110° C.–115° C. Within this period of time, the 3-methyl-4-aminodiphenyl has reacted with the phthalic anhydride to form the corresponding benzoyl-benzoic acid. The temperature is then raised to 150° C. and the whole further stirred, for 1½ hours, at 150° C. and 155° C. The melt is poured on ice and the hydrochloride of 3'-methyl-4'-amino-2-phenyl-anthraquinone separates.

In order to dissolve the aluminium salts, the crude product is boiled with some dilute hydrochloric acid and the residue is filtered with suction. A dilute sodium carbonate is then added to the product for further purification; the hardly soluble grey-green hydrochloride of 3'-methyl-4'-amino-2-phenylanthraquinone is, thereby, transformed into the red base. The reaction product is filtered with suction, washed until neutral and dried in a drying oven. The yield amounts to more than 90%. The red crude product may easily be further purified by sublimating or recrystallizing it. From glacial acetic acid the 3'-methyl-4'-amino-2-phenyl-anthraquinone crystallizes in the form of red needles which have the constant melting point of 199° C.

2. 11 parts of 3-methyl-4-amino-diphenyl hydrochloride are introduced, while stirring at a temperature of 120° C., into a melt of 120 parts of sodium chloride-aluminium chloride. The reaction mixture is then allowed to cool to 110° C. and 8 parts of phthalic anhydride are added. The temperature is, for 30–45 minutes, kept at 110° C.–115° C., then raised and the whole is further stirred, for 1½ hours, at 150–155° C. The melt is worked up as described in Example 1. By recrystallization from glacial acetic acid, the 3'-methyl-4'-amino-2-phenyl-anthraquinone, melting at 119° C., is obtained.

3. 10 parts of 3-methyl-4-amino-diphenyl are introduced, at 120° C., into a melt of 120 parts of sodium chloride-aluminium chloride. The whole is then allowed to cool to 110° C. and 10 parts of ortho-chlorophthalic anhydride are added in portions. While well stirring, the temperature is first kept, for 45 minutes, at 110° C.–115° C. and, thereupon, for 1½ hours at 150° C.–155° C. The melt is worked up as usual. For further purification the crude product is sublimated. By recrystallizing it from chlorobenzene, red needles melting at 255° C. are obtained. The 3'-methyl-4'-amino-2-phenyl-chloroanthraquinone thus obtained forms a dark red vat and dissolves in concentrated sulfuric acid to a dark red solution.

4. 9 parts of 4-aminodiphenyl are introduced, at 120° C., into a melt of 120 parts of sodium chloride-aluminium chloride. 8 parts of phthalic anhydride are added in portions, at a temperature of 110° C. The whole is stirred for 40 minutes at 110° C.–115° C. and, thereupon, for 1¾ hours, at 150° C. After working up the melt, a rust brown crude product is obtained which forms a red vat and dissolves in concentrated sulfuric acid to a red solution. The 4'-amino-2-phenyl-anthraquinone may easily be sublimated. When recrystallizing it from chlorobenzene, it is obtained in the form of long red needles which have the constant melting point of 221° C. Sulfonated with fuming sulfuric acid containing 20% of sulfuric anhydride, the dyestuff dyes wool orange tints.

5. 10 parts of 2-amino-carbazole and 9 parts of phthalic anhydride are melted with 120 parts of sodium chloride-aluminium chloride, as described in the preceding examples. The temperature of the melt is kept, for 30 minutes, at 110° C.–115° C. and the whole is then further stirred, for one hour, at 150° C. After working up as described above, a red-brown crude product is obtained which may easily be sublimated. The phthaloyl-2-amino-carbazole of the following probable constitution

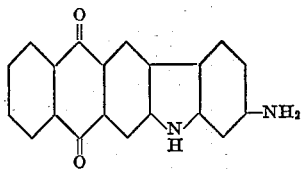

dissolves in concentrated sulfuric acid to a pure blue solution and forms a reddish-green vat. Recrystallized from trichlorobenzene, it is obtained in the form of red needles melting at 355° C. Sulfonated with fuming sulfuric acid containing 20 per cent of sulfuric anhydride, the dyestuff dyes wool yellow-brown tints.

6. 10 parts of 3-amino-N-ethylcarbazol and 8 parts of phthalic anhydride are melted with 120 parts of sodium chloride-aluminium chloride. The whole is stirred, for 30 minutes, at 110° C. and, thereupon, for 1½ hours at 150° C. The melt is worked up, a violet crude product being obtained. The phthaloyl-3-amino-N-ethyl-carbazole of the following probable constitution:

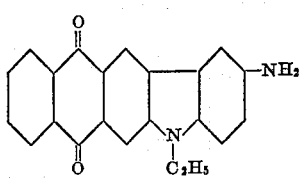

dissolves in concentrated sulfuric acid to a greenish-blue solution and yields a green vat. The product may easily be sublimated and when recrystallized from trichlorobenzene it is obtained in the form of violet needles melting at 296° C. Sulfonated with fuming sulfuric acid containing 20% sulfuric anhydride, the dyestuff dyes wool light-brown tints.

7. 10 parts of 2-amino-diphenylene oxide and 8 parts of phthalic anhydride are melted with 120 parts of sodium chloride-aluminium chloride. The melt is then, as described in the preceding examples, first stirred, for 30 minutes, at 115° C. and, thereupon, for 1½ hours at 150° C. After working up, a red-brown crude product is obtained which yields a red vat and dissolves in concentrated sulfuric acid to a red solution. The phthaloyl-2-amino-diphenylene oxide probably has the following constitution:

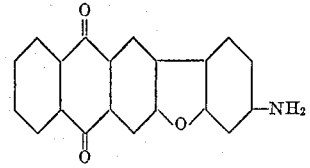

It is, for further purification, sublimed. Red needles are thus obtained which sinter at a temperature of 295° C. and melt, while slowly decomposing, at a temperature above 300° C. Sulfonated with fuming sulfuric acid containing 20% of sulfuric anhydride, the dyestuff dyes wool orange tints.

8. 10 parts of 3-amino-phenanthrene and 9 parts of phthalic anhydride are melted with 120 parts of sodium chloride-aluminium chloride. The melt is first stirred for 45 minutes at 110° C. and, thereupon, for 1½ hours, at 150° C. After working up and subliming, the phthaloyl-3-amino-phenanthrene of the following probable constitution:

is obtained in the form of red crystals which have the constant melting point of 291° C. They dissolve in concentrated sulfuric acid to a red-violet solution and yield a red vat. Sulfonated with fuming sulfuric acid containing 20% of sulfuric anhydride, the dyestuff dyes wool brown tints.

9. 9 parts of 2-amino-fluorene and 8 parts of phthalic anhydride are melted with 120 parts of sodium chloride-aluminium chloride. The melt is first stirred for 40 minutes, at 110° C. and, thereupon, for 1½ hours at 150 C. After working up and subliming the product formed, the phthaloyl-2-amino-fluorene of the following probable constitution:

is obtained in the form of red crystals melting at 293° C. It dissolves in concentrated sulfuric acid to a red solution and yields a red vat. Sulfonated with fuming sulfuric acid containing 20 per cent of sulfuric anhydride, the dyestuff dyes wool orange-red tints.

10. 12 parts of 3-acetamino-N-ethyl-carbazole and 8 parts of phthalic anhydride are introduced, at a temperature of 115° C. into a melt of 120 parts of sodium chloride-aluminium chloride.

The whole is further stirred for 15 minutes at 115° C. and, thereupon, for one hour at 155° C., the melt is worked up as described above, a yellow-brown crude product being obtained. The phthaloyl-3-acetamino-N-ethyl-carbazole of the following probable constitution:

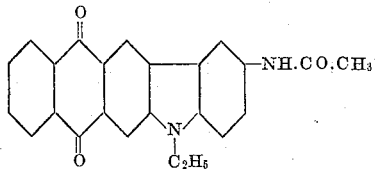

dissolves in concentrated sulfuric acid to a blue-green solution and yields a yellow-green vat. Recrystallizing from trichlorobenzene, it is obtained in the form of yellow crystals melting at 352° C. The acetamino compound may be saponified in the usual manner.

11. 15 parts of 3-benzoylamino-N-ethyl carbazole and 8 parts of phthalic anhydride are introduced, at 115° C., into a melt of 120 parts of sodium chloride-aluminium chloride. The whole is further stirred, for 15 minutes, at 115° C. and, thereupon, for one hour at 155° C. After working up as described above a brown crude product is obtained. The phthaloyl-3-benzoylamino-N-ethylcarbazole dissolves in concentrated sulfuric acid to a blue solution and yields a yellow-green vat. Recrystallized from trichlorobenzene, it is obtained in the form of yellow crystals melting at 336° C.

12. 113 parts of 4-acetamino-3-methyl-diphenyl are introduced while well stirring at a temperature of 105° C.–110° C., into 1200 parts of molten sodium chloride-aluminium chloride (mixing proportion: 350 parts of NaCl–2000 parts of $AlCl_3$). 80 parts of phthalic anhydride are then added in small portions at the same temperature within 10 minutes. The reaction is complete as soon as a test portion of the product on addition of caustic soda solution dissolves nearly entirely in water, which is the case after about 5 minutes. The melt is then poured on ice and 150 parts by volume of concentrated hydrochloric acid are added; the mixture is well boiled, whereby the reaction product agglomerates to a lump. The solution is decanted, the hump is, after cooling, finely triturated and boiled with water until the reaction product is obtained in the form of grains.

It is then dissolved in dilute sodium carbonate solution, boiled, filtered from some undissolved matter and the filtrate is precipitated by means of hydrochloric acid. After filtering with suction, washing until neutral and drying, 168 parts of light-yellow 4-(ortho-carboxy)-benzoyl-3'-methyl-4'-acetamino-diphenyl, melting at 228° C.–230° C. are obtained. The keto-carboxylic acid is, for further purification, boiled with 750 parts by volume of alcohol, allowed to cool, filtered with suction, washed with a small amount of alcohol and dried. There remain 155 parts of 4-(ortho-carboxy)-benzoyl-3'-methyl-4'-acetaminodiphenyl melting at 238° C.–240° C. The yields amounts to 84% of the theoretical.

155 parts of 4-(ortho-carboxy)-benzoyl-3'-methyl-4'-acetaminodiphenyl are introduced into 800 parts by volume of sulfuric acid monohydrate and heated, for 4–5 hours, at 110° C.–120° C. After cooling, the solution is poured on ice, the yellow-green sulfate of 3'-methyl-4'-amino-2-phenyl-anthraquinone which separates is filtered with suction and washed with water. The still moist sulfate is introduced into 4000–5000 parts by volume of a caustic soda solution of 3–5 per cent strength of boiling temperature; the product is filtered with suction and washed with hot water, until the filtrate is colorless. After drying, 120 parts of 3'-methyl-4'-amino-2-phenyl-anthraquinone melting at 192° C. are obtained. The yield amounts to 92% calculated upon 4-(ortho-carboxy)-benzoyl-3'-methyl-4'-acetamino-diphenyl. By recrystallizing the product from glacial acetic acid it is obtained in the form of red needles melting at 198° C.

13. 40 parts of 4-acetamino-diphenyl are introduced, while, stirring into a melt of 400 parts of sodium chloride-aluminium chloride, at a temperature of 120° C. The whole is allowed to cool to 100° C. and 35 parts of phthalic anhydride are added in small portions. On addition of the phthalic anhydride, the temperature quickly rises. Since the reaction temperature must not surpass 105–110° C., the phthalic anhydride is added in small portions. As soon as all of the phthalic anhydride, has been introduced, the whole is further stirred, for 5 minutes, at 110° C.; the melt is then poured on ice, whereby the light-yellow 2-(4''-acetamino-4'-phenyl-benzoyl)-benzoic acid separates. In order to dissolve the aluminium salts, the reaction mixture is strongly acidified by means of dilute hydrochloric acid, boiled and filtered with suction. The crude product is, for further purification, again boiled with water in order to dissolve the phthalic acid which may perhaps be present. A sufficient amount of dilute sodium carbonate solution is added to the residue; the whole residue, thereby, dissolves, in the case the melt has been performed well; some animal charcoal is then added, the whole is boiled and filtered through a filter. The filtrate is acidified by means of dilute hydrochloric acid, the white 2-(4''-acetamino-4'-phenyl-benzoyl)-benzoic acid separating in a very pure form. The whole is filtered with suction, the residue is washed until neutral and dried in a drying oven at about 100° C. The yield amounts to 65 grams which corresponds to more than 90% of the theoretical. The acid is, for further purification, either immediately after filtering with suction or after drying, heated for ¼ hour, on the steam bath under reflux, with about 500 parts by volume of methanol, in order to dissolve unimportant impurities. After cooling and filtering with suction, the 2-(4''-acetamino-4'-phenyl-benzoyl)-benzoic acid is obtained in a very pure form; it is very suitable for further chemical reactions, especially for ring closure with formation of 4'-amino-2-phenyl-anthraquinone. The melting point of the pure acid (recrystallized from alcohol) is 256° C.

80 parts of 2-(4''-acetamino-4'-phenyl-benzoyl)-benzoic acid are introduced into 400 parts by volume of sulfuric acid monohydrate and heated, while stirring, for 4½–5 hours at a temperature of 120° C.; it is then allowed to cool and poured on ice, whereby the greenish-yellow sulfate of 4'-amino-2-phenyl-anthraquinone separates. The whole is heated and the sulfate is filtered with suction. It is then introduced into 2000 parts of a caustic soda solution of 3–5% strength. The blood-red 4'-amino-2-phenyl-anthraquinone is immediately formed. The alkaline suspension is boiled and filtered with suction. The residue is washed until neutral by means of hot water, until the filtrate is lightred. The residue is dried. The yield amounts to 65 grams which corresponds to 96% of the theoretical. Recrystallized from chlorobenzene, the product is obtained in the form of long, red needles melting at 221° C.

14. 106 parts of 2-acetylamino-diphenyl are introduced while well stirring, into 1200 parts of molten sodium chloride-aluminium chloride (mixing proportion: 350 parts of NaCl–2000 parts of AlCl₃), at a temperature of 105° C.–110° C. 80 parts of phthalic anhydride are then added in small portions at the same temperature within 10–15 minutes. The reaction is complete as soon as a test portion of the product, on addition of caustic soda solution, nearly entirely dissolves in water, which is the case after about 5 minutes. The batch is worked up and the crude product is purified as described in Example 12. 142 parts of 4-(ortho-carboxy)-benzoyl-2'-acetylamino-diphenyl, melting at 245° C.–248° C., are thus obtained; the yield amounts to 79% of the theoretical.

110 grams of 4-(ortho-carboxy)-benzoyl-2'-acetylamino-diphenyl are introduced into 500 parts by volume of sulfuric acid monohydrate and heated, for 1½–2 hours, at 110° C.–120° C. After working up, as described in Example 12, there are obtained 84 parts of a crude product namely a mixture of 2'-amino-2-phenyl-anthraquinone and 2'-acetylamino-2-phenyl-anthraquinone. The well dried and finely pulverized product is introduced into 350 parts by volume of acetic anhydride of 80°–90° C. and the whole is heated to boiling for half an hour. 200 parts by volume of dichlorobenzene are then added, the whole is boiled, filtered while hot; the 2'-acetylamino-2-phenyl-anthraquinone which separates in the form of well-defined crystals from the cooled filtrate, is filtered with suction and washed with alcohol.

This application is a divisional of application Serial No. 192,564, filed February 25, 1938, Patent No. 2,281,583.

I claim:

1. The compounds of the general formula

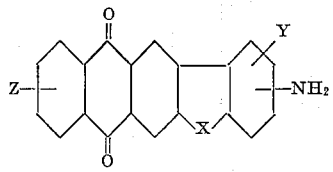

wherein X represents a member of the group of bivalent radicals consisting of —CH₂ and —CH=CH—, Y represents a member of the group consisting of hydrogen and methyl, Z represents a member of the group consisting of hydrogen and chlorine, and their sulfonation products.

2. The compounds of the general formula

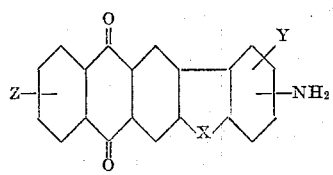

wherein X represents a member of the group of bivalent radicals consisting of —CH₂— and —CH=CH, Y represents a member of the group consisting of hydrogen and methyl, Z represents a member of the group consisting of hydrogen and chlorine.

3. The compounds of the general formula

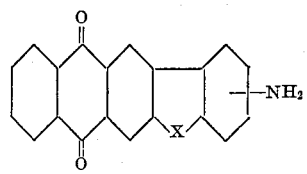

wherein X represents a member of the group of bivalent radicals consisting of —CH₂— and —CH=CH—.

4. The compound of the formula

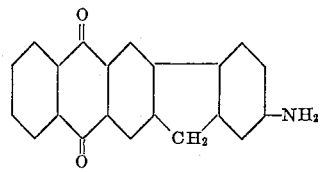

forming red crystals, melting at a temperature of 293° C., the color of its solution in concentrated sulfuric acid as well as the color of its vat being red.

5. The process which comprises condensing in the presence of aluminium chloride a primary amino compound of the general formula

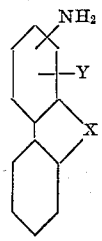

wherein X represents a member of the group of bivalent radicals consisting of —CH₂— and —CH=CH—, Y represents a member of the group consisting of hydrogen and methyl with a member of the group consisting of phthalic anhydride and chlorine substitution products of phthalic anhydride.

6. The process which comprises condensing at a temperature of at first about 110° C. and later about 150° C. in the presence of aluminium chloride a primary amino compound of the general formula

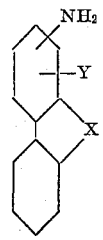

wherein X represents a member of the group of bivalent radicals consisting of —CH₂— and —CH=CH—, Y represents a member of the group consisting of hydrogen and methyl with a member of the group consisting of phthalic anhydride and chlorine substitution products of phthalic anhydride.

7. The process which comprises heating for 40 minutes at 110° C. and then for 90 minutes at 150° C., while stirring, in a sodium chloride-aluminium chloride melt 2-aminofluorene together with phthalic anhydride.

8. The process which comprises condensing in the presence of aluminium chloride a primary amino compound of the general formula

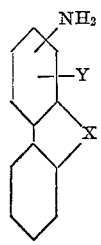

wherein X represents a member of the group of bivalent radicals consisting of —CH₂— and —CH=CH—, Y represents a member of the group consisting of hydrogen and methyl with a member of the group consisting of phthalic anhydride and chlorine substitution products of phthalic anhydride and sulfonating the products obtained.

PAUL KRÄNZLEIN.